(12) United States Patent
Parker et al.

(10) Patent No.: US 11,130,463 B2
(45) Date of Patent: Sep. 28, 2021

(54) FORKED FAR-SIDE AIRBAG ASSEMBLY

(71) Applicant: Autoliv ASP, Inc., Ogden, UT (US)

(72) Inventors: Don Larry Parker, Syracuse, UT (US); Andrew Lawrence Holliday, Pleasant View, UT (US); Derek John Wiscombe, Morgan, UT (US); Adam Smith, Plain City, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 16/742,680

(22) Filed: Jan. 14, 2020

(65) Prior Publication Data
US 2021/0213904 A1  Jul. 15, 2021

(51) Int. Cl.
*B60R 21/207* (2006.01)
*B60R 21/231* (2011.01)
*B60R 21/2338* (2011.01)

(52) U.S. Cl.
CPC ........ *B60R 21/207* (2013.01); *B60R 21/2338* (2013.01); *B60R 2021/23107* (2013.01); *B60R 2021/23146* (2013.01); *B60R 2021/23161* (2013.01)

(58) Field of Classification Search
CPC .............. B60R 21/207; B60R 21/2338; B60R 2021/23107; B60R 2021/23146; B60R 2021/23161
See application file for complete search history.

(56) References Cited

U.S. PATENT DOCUMENTS

| | | | |
|---|---|---|---|
| 10,377,337 B2 * | 8/2019 | Kunisada | B60R 21/207 |
| 10,703,325 B2 * | 7/2020 | Schneider | B60R 21/2338 |
| 10,717,405 B2 * | 7/2020 | Marciniak | B60R 21/235 |
| 10,870,405 B2 * | 12/2020 | Kwon | B60R 21/207 |
| 10,906,495 B2 * | 2/2021 | Nagasawa | B60R 21/0132 |
| 2019/0054890 A1 * | 2/2019 | Kwon | B60R 21/23138 |
| 2019/0061676 A1 | 2/2019 | Kwon | |
| 2019/0161050 A1 | 5/2019 | Schneider | |
| 2019/0283700 A1 | 9/2019 | Kwon | |

OTHER PUBLICATIONS

International Search Report and Written Opinion dated Mar. 9, 2021 for international application PCT/US2021/012832.

* cited by examiner

*Primary Examiner* — Faye M Fleming
(74) *Attorney, Agent, or Firm* — Stoel Rives LLP

(57) ABSTRACT

A forked far-side airbag assembly includes a housing to be mounted in an inboard portion of a seat of a vehicle and an inflator assembly that is at least partially disposed within the housing. The forked far-side airbag assembly includes an airbag in a packaged state within the housing, the airbag to receive inflation gas to expand and deploy from the housing to a deployed state. The airbag assembly includes a first inflatable chamber extending in a longitudinal direction of a vehicle, and a second inflatable chamber oriented at a first angle from an inboard side of the first inflatable chamber, and a third inflatable chamber oriented at a second angle from the inboard side of the first inflatable chamber, wherein the first angle is different from the second angle.

20 Claims, 3 Drawing Sheets

FORKED FAR-SIDE AIRBAG ASSEMBLY

TECHNICAL FIELD

The present disclosure relates generally to the field of automotive protective systems. More specifically, the present disclosure relates to far-side airbag assemblies and systems that are configured to deploy in response to frontal, oblique, and side impact collision events.

BACKGROUND

Inflatable airbags may be mounted within a vehicle and may deploy during a collision event. The deployed airbag may cushion an occupant and prevent detrimental impact with other vehicular structures and other occupants. Some airbags suffer from one or more drawbacks or may perform less than optimally in one or more respects. Certain embodiments disclosed herein can address one or more of these issues.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered limiting of the scope of the disclosure, the embodiments will be described and explained with specificity and detail in reference to the accompanying drawings.

DETAILED DESCRIPTION

Figure 1:
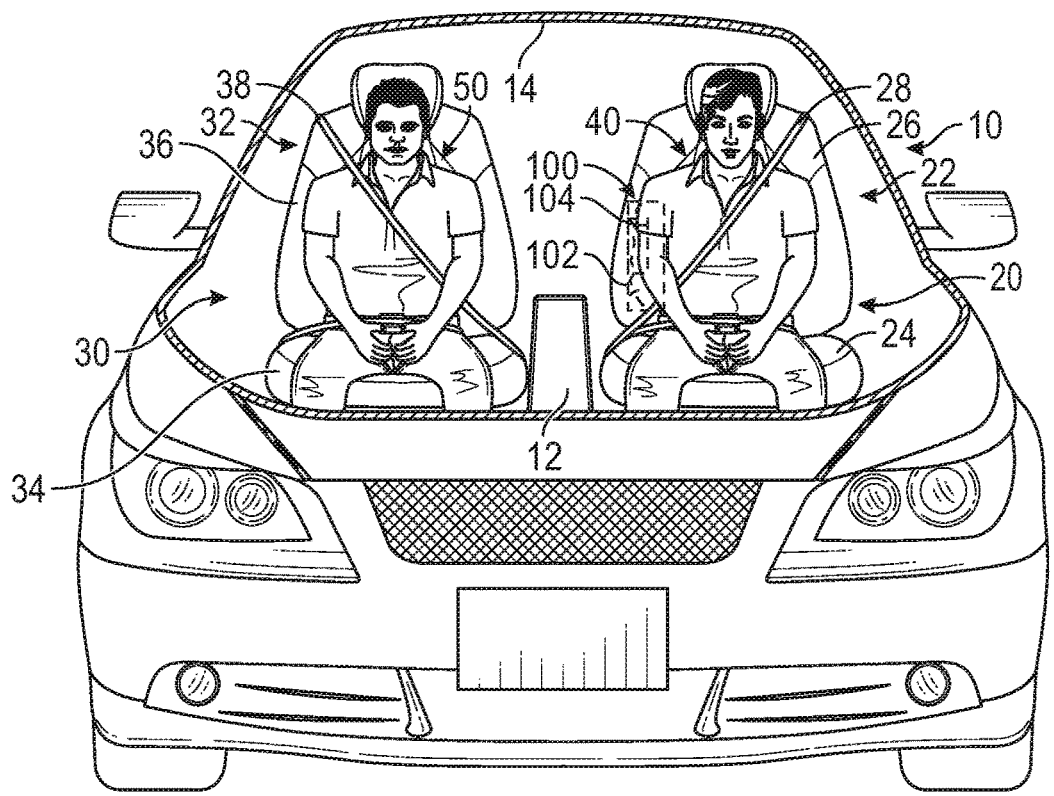
FIG. 1 is a front cut-away view of an interior of a vehicle having an inflatable airbag system depicted in an undeployed configuration, according to one embodiment of the present disclosure.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

Inflatable airbag systems are widely used to reduce or minimize occupant injury during a collision event. Airbag modules have been installed at various locations within a vehicle, including, but not limited to, in the steering wheel, in the dashboard and/or instrument panel, within the side doors or side seats, adjacent to a roof rail of the vehicle, in an overhead position, or at the knee or leg position. In the following disclosure, "airbag" generally refers to an inflatable side airbag, such as, for example, an airbag that is typically housed in a seat of a vehicle, although the principles discussed may apply to other types of airbags (e.g., driver airbags housed within the steering wheel or otherwise near the driver, side airbags housed in doors, roof, or pillars, knee airbags, and frontal passenger airbags).

During installation, the disclosed airbags are typically disposed at an interior of a housing in a packaged state (e.g., are rolled, folded, and/or otherwise compressed) or a compact configuration and may be retained in the packaged state behind a cover. During a collision event, an inflator is triggered, which rapidly fills the airbag with inflation gas. The airbag can rapidly transition from the packaged state of the compact configuration to an expanded state of a deployed configuration. For example, the expanding airbag can open an airbag cover (e.g., by tearing through a burst seam or opening a door-like structure) to exit the housing. The inflator may be triggered by any suitable device or system, and the triggering may be in response to and/or influenced by one or more vehicle sensors.

During side impact crashes it is possible for an occupant to move in a predominantly lateral direction toward another adjacent occupant. For example, a passenger in a front row of a vehicle may move laterally toward a driver of the vehicle in the front row of the vehicle. Alternatively, the driver in the front row of the vehicle may move laterally toward the passenger in the front row of the vehicle. If and when adjacent occupants in the same row contact one another, serious injury or death may occur. Far-side airbags, or front-center airbags have been developed to prevent occupant-to-occupant interaction but current versions can easily be moved out of the ideal position due to rapid movement of the occupant(s). Certain embodiments of airbag assemblies that are disclosed herein are particularly well suited for cushioning a front-seat passenger, and may be mounted in a seat of a vehicle.

Far-side airbags and front-center airbags are currently used in vehicles. Most single-sided countermeasures can move out of position when contacted by the occupant. Some single-sided countermeasures rely heavily on interaction with the opposite side seat while the seats are aligned, but do not take into consideration when the seat are not aligned, for example, when the passenger seat is laterally in front of or behind the driver's seat. Other versions use two airbags, one deployed from each of the driver's seat and the passenger's seat, which is effective, but adds cost, variability, and complexity.

Benefits of the disclosed forked far-side airbag assembly include that it is a singular module, as opposed to an alternative which uses two modules. Another benefit of the disclosed forked far-side airbag assembly is the assembly is not dependent on the comparative lateral position of the driver's seat and the passenger's seat and therefore is more reliable than other alternatives.

FIG. 1 is a front cut-away view of a vehicle 10 depicting an interior of the vehicle and having an inflatable airbag assembly 100, according to an embodiment of the present disclosure. The vehicle 10 includes multiple vehicle seating positions. For example, the vehicle 10 may include a driver vehicle seating position 20 and a passenger vehicle seating position 30 which are both located in a front row of the vehicle 10. The vehicle seating positions 20 and 30 are defined by a seat assembly 22, 32, which includes a seat 24, 34, a seatback 26, 36, and a restraint harness 28, 38 (e.g., a seat belt). Occupants 40, 50 are shown in the vehicle seating positions 20 and 30 for reference. The occupant 40 in the driver vehicle seating position 20 may be a driver of the vehicle 10. There are some embodiments in which the vehicle 10 is a self-driving car, so the occupant 40 may simply be a passenger. The occupant 50 in the passenger vehicle seating position 30 may also be a passenger.

The inflatable airbag assembly 100 comprises a housing 102 and an inflator 104 that is mounted between the occupant 40 in the driver vehicle seating position 20 and the occupant 50 in the passenger vehicle seating position 30. In the illustrated embodiment, the housing 102 may be mounted to an inboard portion of the seatback 26 of the driver vehicle seating position 20. The inflator 104 may be coupled to the housing, and may be disposed partially or completely within the housing 102.

The housing 102 may be mounted in a number of different positions between the occupant 40 in the driver vehicle seating position 20 and the occupant in the passenger vehicle seating position 30. In some embodiments, the housing 102 may be mounted to an inboard portion of the seat 24 of the driver vehicle seating position 20. In some embodiments, the housing 102 may be mounted to an inboard portion of the seatback 36 of the passenger vehicle seating position 30. In some embodiments, the housing 102 may be mounted to an inboard portion of the seat 34 of the passenger vehicle seating position 30. In some embodiments, the housing 102 may be mounted in a console 12 disposed with the driver vehicle seating position 20 and the passenger vehicle seating position 30.

Although FIG. 1 and other figures may illustrate the occupants 40, 50 with their restraint harnesses 28, 38 employed, the operation of the inflatable airbag assembly 100 is independent of, and does not depend in any way on, the restraint harness 28 or 38.

Figure 2:
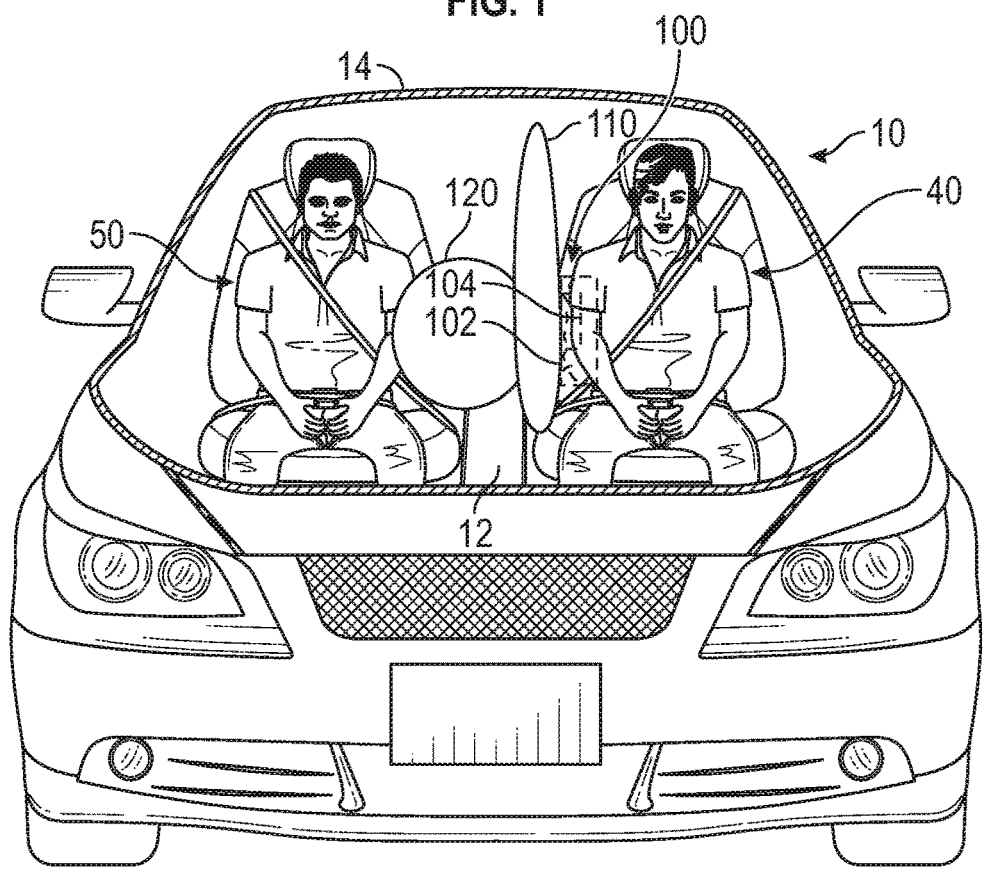
FIG. 2 is a front view of the inflatable airbag system of FIG. 1 in a deployed configuration.
Figure 3:
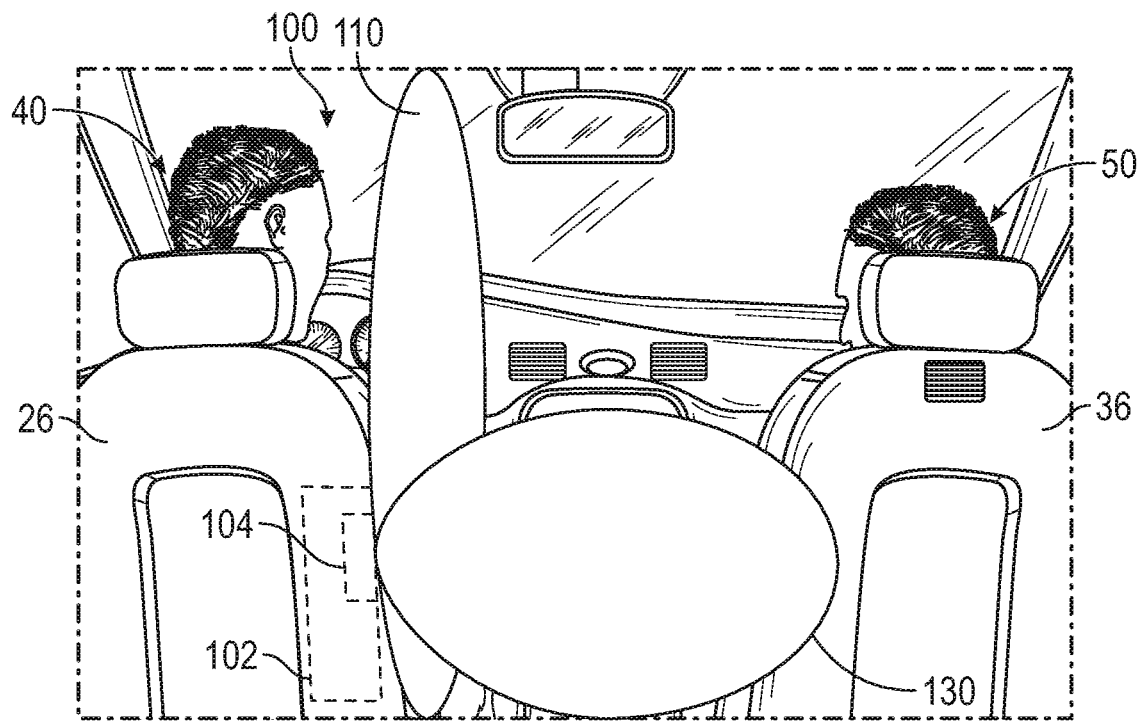
FIG. 3 is a rear view of the inflatable airbag system of FIG. 1 in a deployed configuration.

FIGS. 2 and 3 illustrate the inflatable airbag assembly 100 in a deployed configuration. FIG. 2 is a front view into the interior of the vehicle 10, showing the inflatable airbag assembly 100 deployed and at least partially inflated. This front view of FIG. 2 provides a rearward perspective of the interior of the vehicle 10. FIG. 3 is a rear view of the interior of the vehicle 10, showing the inflatable airbag assembly 100 deployed and at least partially inflated. This rear view of the interior of the vehicle 10 provides a forward perspective from behind the vehicle seating positions 20, 30 (see FIG. 1).

The inflatable airbag assembly 100 may comprise a plurality of inflatable chambers. In one embodiment, the inflatable airbag assembly 100 may comprise a first chamber 110, a second chamber 120, and a third chamber 130. In some embodiments, the inflatable airbag assembly 100 may comprise a single chamber that accomplishes the functions of the three separate chambers 110, 120, 130. In some embodiments, the chambers 110, 120, and 130 may be distinct chambers. The inflator 104 may simultaneously inflate the three chambers 110, 120, and 130 and in some embodiments, the inflator 104 may inflate the chambers 110, 120, and 130 in a specific order based on the flow of the inflation gas into the inflatable airbag assembly 100 or through vents (or a pattern or arrangement thereof) within the three chambers 110, 120, and 130.

The second chamber 120 is shown in FIG. 2 and the third chamber 130 is shown in FIG. 3. The chambers 110, 120, 130 may be inflated via an inflator port to an inflation pressure. The inflatable airbag assembly 100 may be deployed by action of the inflator 104, which may be activated by, for example, one or more sensors detecting the vehicle 10 being involved in a collision event. The inflator 104 may provide inflation gas to the inflatable airbag assembly 100 via the inflator port and thereby cause the inflatable airbag assembly 100 to deploy from the housing 102 and begin inflating.

The first chamber 110 of the inflatable airbag assembly 100 may act as a barrier between the occupants 40, 50 in the driver vehicle seating position 20 and the passenger vehicle seating position 30. For example, during a side impact collision, it is possible for an occupant (e.g., occupant 40) to move in a predominantly lateral direction toward another adjacent occupant (e.g., occupant 50). Accordingly, if one of the occupants moves laterally toward to the other occupant during a collision event, the deployed first chamber 110 acts as a barrier and prevents the occupant from hitting the other occupant.

In the deployed configuration, the first chamber 110 may extend in a substantially longitudinal direction of the vehicle 10. For example, in one embodiment, the first chamber 110 extends longitudinally from a seatback 26 of the driver vehicle seating position 20 toward a dashboard (see FIG. 3) of the vehicle 10. In some embodiments, the first chamber 110 may engage with the dashboard of the vehicle 10. The first chamber 110 may extend in a substantially vertical direction of the vehicle 10. For example, in the illustrated embodiment, the first chamber 110 may extend vertically from a seat 24 of the driver vehicle seating position 20 toward a roof 14 of the vehicle 10. In some embodiments, the first chamber 110 engages with the roof 14 of the vehicle. In some embodiments, the first chamber 110 extends above the seatback 26 of the vehicle but does not engage with the roof 14 of the vehicle. In other words, the height of the first chamber 110 may be high enough that the first chamber 110 acts as a barrier against a head of the nearest occupant 40.

The first chamber 110 may have a number of different shapes. For example, in some embodiments, a side view of the first chamber 110 would reveal a rectangular shape. However, the present disclosure is not so limited, and the first chamber 110 may have an oval shape, a polygonal shape, a circular shape, and the like. The shape of the first chamber 110 simply provides a barrier to prevent contact between adjacent occupants 40, 50 during a collision event. The size and shape of the first chamber 110 is designed to meet the proposed Euro NCAP coverage requirements for far-side airbags.

As illustrated in FIG. 2, the second chamber 120 in the deployed configuration is partially deployed in front of the seatback 36 of the passenger vehicle seating position 30. In situations where the occupant 50 is disposed or present in the passenger vehicle seating position 30, the second chamber 120 may be configured to extend in front of the occupant 50, as illustrated in FIG. 2. The deployment of the second chamber 120 may be reversed if the airbag assembly is disposed in the inboard side of the passenger vehicle seating position 30 in that the second chamber 120 is deployed in front of the seatback 26 of the driver vehicle seating position 20.

The second chamber 120 may further include adaptive vents and/or internal pressure differential chambers which may prevent unwanted interaction with the passenger 50 if the passenger happens to be out of position. The deployment of the second chamber 120 occurs independent of the occupant presence/position and provides a reaction surface for the first chamber 110 to thereby limit or prevent occupant-to-occupant interaction.

The second chamber 120 may have a variety of different shapes. In some embodiments, the second chamber 120 may have a circular shape. In other embodiments, the second chamber 120 may have a rectangular shape, a polygonal shape, a triangular shape, and the like.

As illustrated in FIG. 3, the third chamber 130 in the deployed configuration is partially deployed behind the seatback 36 of the passenger vehicle seating position 30. The deployment of the third chamber 130 may be reversed if the airbag assembly is disposed in the inboard side of the passenger vehicle seating position 30 in that the third chamber 130 is deployed in back of the seatback 26 of the driver vehicle seating position 20.

The third chamber 130 may further include adaptive vents and/or internal pressure differential chambers which may prevent unwanted interaction with out-of-position passengers in a second row of the vehicle 10.

The third chamber 130 may have a variety of different shapes. In some embodiments, the third chamber 130 may have a circular shape. In other embodiments, the second chamber 120 may have a rectangular shape, a polygonal shape, a triangular shape, and the like. In some embodiments, the third chamber 130 is smaller than the second chamber 120. In some embodiments, the second chamber 120 may extend higher vertically than the third chamber 130. The third chamber 130 is designed to require a minimum amount of inflation gas as possible.

Figure 4:
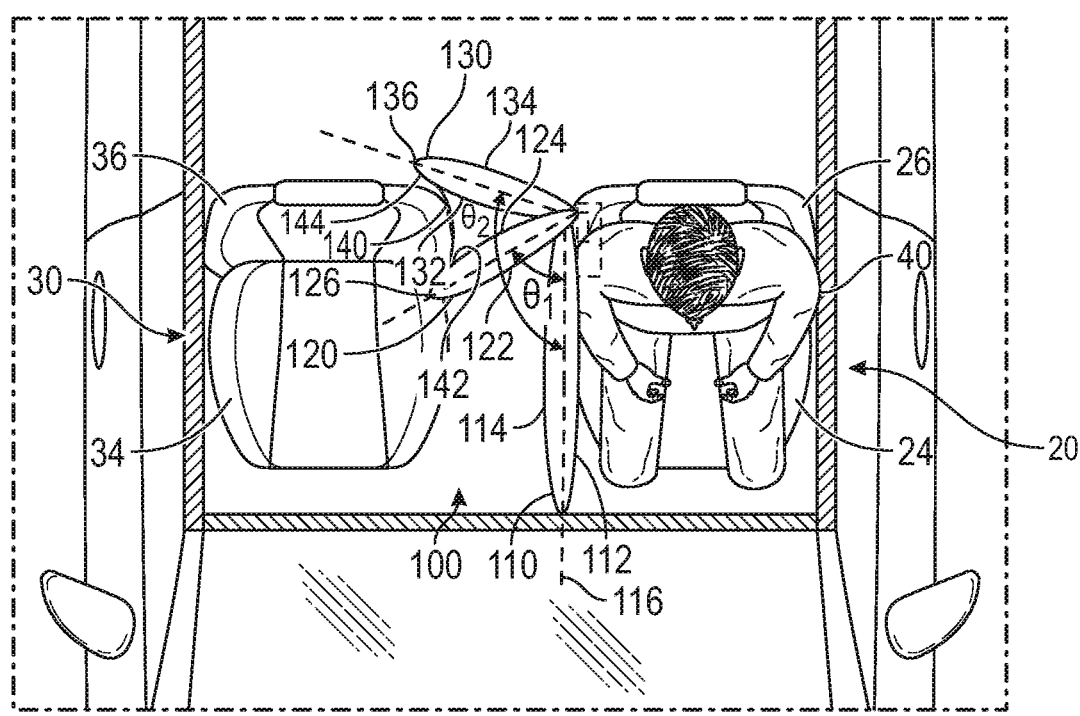
FIG. 4 is a top view of an inflatable airbag system, according to one embodiment of the present disclosure, in a deployed configuration with a driver's seat and a passenger's seat laterally aligned.

FIG. 4 illustrates a top view of the inflatable airbag assembly 100 in the deployed configuration. As previously discussed, the first chamber 110 extends in a longitudinal direction of the vehicle 10 from the seatback 36 of the driver vehicle seating position 20 toward the dashboard of the vehicle 10. The first chamber 110 includes an outboard side 112 and an inboard side 114. A longitudinal axis 116 of the first chamber 110 may be substantially parallel to the longitudinal direction of the vehicle 10.

As discussed previously, in the deployed configuration the second chamber 120 is partially disposed in front of the seatback 36 of the adjacent seating position 30 and the third chamber 130 is partially disposed behind the seatback 36 of the adjacent seating position 30. The second chamber 120 includes a front face 122 and a back face 124, and a tip 126. The second chamber 120 is disposed on an inboard side 114 of the first chamber 110. The second chamber 120 is oriented at a first angle $\theta_1$, such that it extends away from the first chamber 110 in a direction transverse (nonparallel) to an axis 116 of the first chamber 110.

The third chamber 130 includes a front face 132 and a back face 134, and a tip 136. The third chamber 130 is disposed on an inboard side 114 of the first chamber 110. The third chamber 130 is oriented at a second angle $\theta_2$, such that it extends away from the first chamber 110 in a direction transverse to the axis 116 of the first chamber 110 and transverse to the second chamber 120. The first angle $\theta_1$ may be different from the second angle $\theta_2$. In some embodiments, the first angle $\theta_1$ forms an acute angle relative to the axis 116 of the first chamber 110 and the second angle $\theta_2$ forms an obtuse angle relative to the axis 116 of the first chamber 110. In some embodiments, the difference between the second angle $\theta_2$ and the first angle $\theta_1$ may be less than 90 degrees. The orientations of the second chamber 120 and the third chamber 130 provide a forked configuration between the chambers 120 and 130.

The inflatable airbag assembly 100 further comprises a tether 140 that couples the second chamber 120 to the third chamber 130. A first end 142 of the tether 140 couples to a rear side 124 of the second chamber 120 and the second end 144 of the tether couples to a forward side 132 of the third chamber 130. The first end 142 of the tether 140 is coupled near a tip 126 of the second chamber 120. The second end 144 of the tether 140 is coupled near a tip 136 of the third chamber 130. In some embodiments, the inflatable airbag assembly 100 may comprise a plurality of tethers that are coupled to the second chamber 120 and the third chamber 130. Each tether may have a different length. For example, a tether closer to the adjacent seatback 36 may be longer than a tether farther away from the adjacent seatback 36.

The second chamber 120, the third chamber 130, and the tether 140 act together to stabilize the first chamber 110 during a collision event. During deployment, the tether 140 engages with the adjacent seatback, in the illustrated embodiment, and the adjacent seatback is seatback 36 of the passenger vehicle seating position 30. When the tether 140 engages with the adjacent seatback 36, the tether 140 pulls the second chamber 120 toward the third chamber 130. Accordingly, the second chamber 120 and the third chamber 130 pinch the adjacent seatback 36. In other words, the second chamber 120 engages a front surface of the seatback 36 and the third chamber 130 engages a back surface of the seatback 36.

FIG. 4 illustrates that the driver vehicle seating position 20 and the passenger vehicle seating position 30 are laterally aligned. One of the benefits of the inflatable airbag assembly 100 is that the inflatable airbag assembly 100 is designed to deploy correctly whether or not the vehicle seating positions 20, 30 are laterally aligned.

Figure 5:
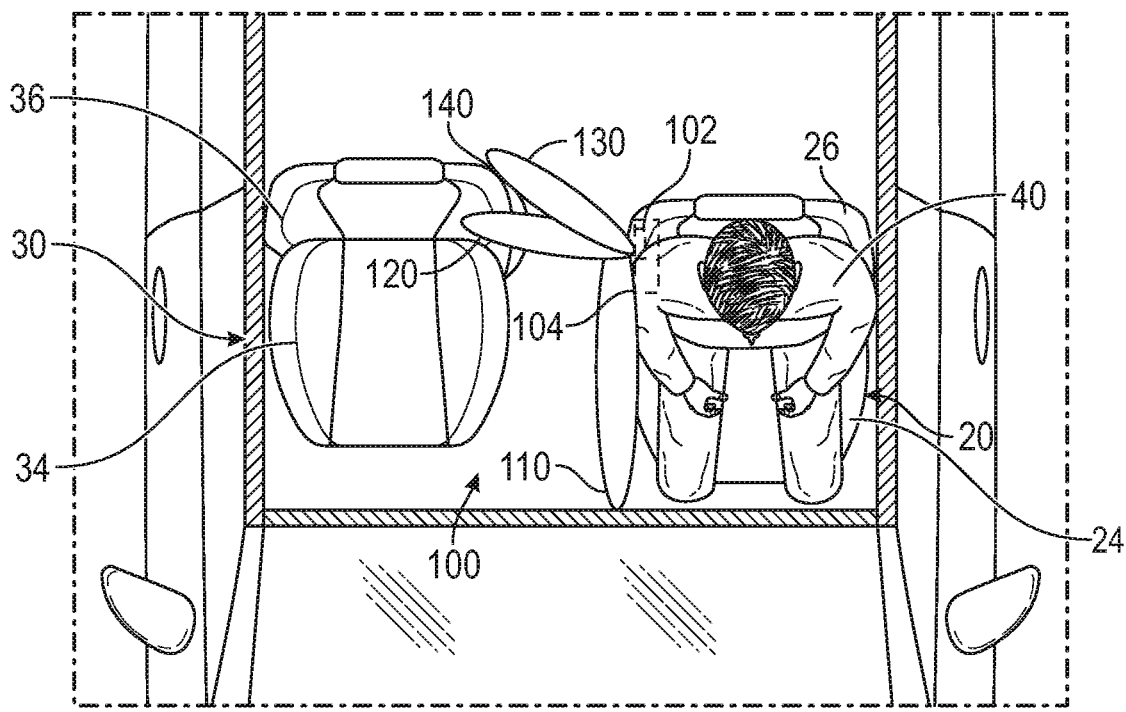
FIG. 5 is a top view of an inflatable airbag system, according to one embodiment of the present disclosure, in a deployed configuration with a driver's seat laterally disposed in front of a passenger's seat.

In FIG. 5, the driver vehicle seating position 20 is not laterally aligned with the passenger vehicle seating position 30. The driver vehicle seating position 20 is disposed longitudinally in front of the passenger vehicle seating position 30. However, despite the fact that the vehicle seating positions 20, 30 are not laterally aligned, the inflatable airbag assembly 100 deploys correctly because the forked configuration of the second chamber 120, the third chamber 130, and the tether 140 are able to engage with the seatback 36 of the adjacent vehicle seating position, e.g., the passenger vehicle seating position 30.

Figure 6:
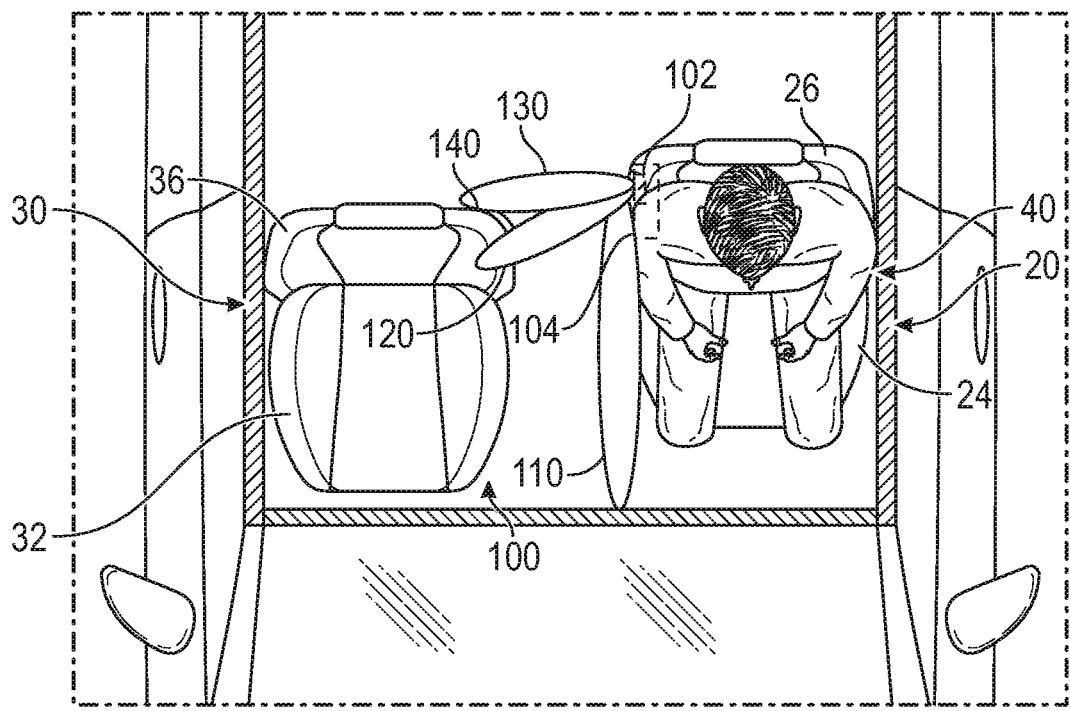
FIG. 6 is a top view of an inflatable airbag system, according to one embodiment of the present disclosure, in a deployed configuration with a driver's seat laterally disposed behind a passenger's seat.

In FIG. 6, the driver vehicle seating position 20 is also not laterally aligned with the passenger vehicle seating position 30. The driver vehicle seating position 20 is disposed longitudinally in back of or behind the passenger vehicle seating position 30. However, despite the fact that the vehicle seating positions 20, 30 are not laterally aligned, the inflatable airbag assembly 100 deploys correctly because the forked configuration of the second chamber 120, the third chamber 130, and the tether 140 are able to engage with the seatback 36 of the adjacent vehicle seating position, e.g., the passenger vehicle seating position 30.

FIGS. 4-6 do not illustrate the passenger 50 in the passenger vehicle seating position 30. However, the inflatable airbag assembly 100 is not dependent on a passenger being present in or absent from the passenger vehicle seating position 30. In some embodiments, the passenger vehicle seating position 30 may include a sensor to detect whether the passenger 50 is sitting in the passenger vehicle seating position 30. In some embodiments, if the sensor detects the passenger 50 the inflatable airbag assembly 100 deploys, and if the sensor does not detect the passenger 50 the inflatable airbag assembly 100 does not deploy. In some embodiments, the inflatable airbag assembly 100 will deploy whether or not the passenger 50 is in the passenger vehicle seating position 30.

Throughout this specification, the phrases "coupled to" and "in communication with" refer to any form of interaction between two or more entities, including mechanical, electrical, magnetic, electromagnetic, fluid, and thermal interaction. Two components may be coupled to each other even though they are not in direct contact with each other. The terms "abut" and "abutting" refer to items that are in direct physical contact with each other, although the items may not necessarily be attached together.

As used herein, "inboard" refers to a direction toward a centerline of a vehicle and "outboard" refers to a direction out of the vehicle and away from a centerline of the vehicle.

The phrases "attached to" or "attached directly to" refer to interaction between two or more entities which are in direct contact with each other and/or are separated from each other only by a fastener of any suitable variety (e.g., mounting hardware or an adhesive).

The phrase "fluid communication" is used in its ordinary sense, and is broad enough to refer to arrangements in which a fluid (e.g., a gas or a liquid) can flow from one element to another element when the elements are in fluid communication with each other.

The terms "a" and "an" can be described as one, but not limited to one. For example, although the disclosure may recite an airbag having "a chamber," the disclosure also contemplates that the airbag can have two or more chambers.

The terms "longitudinal" and "longitudinally" refer to a direction or orientation extending or spanning between a front of a vehicle and a rear of the vehicle.

As used herein, the terms "forward" and "rearward" are used with reference to the front and back of the relevant vehicle. For example, an airbag cushion that deploys in a rearward direction deploys toward the back of a vehicle. Furthermore, other reference terms, such as "horizontal," are used relative to a vehicle in which an airbag assembly is installed, unless it is clear from context that a different reference frame is intended. Thus, a term such as "horizontal" is used relative to the vehicle, whether or not the vehicle itself is oriented horizontally (e.g., is positioned upright on level ground) or angled relative to true horizontal (e.g., is positioned on a hill).

Unless otherwise stated, all ranges include both endpoints and all numbers between the endpoints.

The phrase "vehicle seating position" refers to the position in which an occupant is generally positioned when seated in a seat of a vehicle. The term "occupant" refers to a person or crash test dummy within a vehicle.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. It will be apparent to those having skill in the art that changes may be made to the details of the above-described embodiments without departing from the underlying principles of the invention. Embodiments of the invention in which an exclusive property or privilege is claimed are defined as follows.

The invention claimed is:

1. An airbag assembly comprising:
    a housing to be mounted in an inboard portion of a first seat assembly;
    an inflator assembly at least partially disposed within the housing; and
    an airbag in a packaged state within the housing, the airbag to receive inflation gas to expand and deploy from the housing to a deployed state, the airbag in the deployed state comprising:
        a first inflatable chamber extending in a longitudinal direction of a vehicle;
        a second inflatable chamber at least partially disposed in front of a second seatback of a second seat assembly laterally adjacent to the first seat assembly; and
        a third inflatable chamber at least partially disposed behind the second seatback.

2. The airbag assembly of claim 1, wherein the second inflatable chamber is oriented at a first angle from an inboard side of the first inflatable chamber, and wherein the first angle is defined in a horizontal plane.

3. The airbag assembly of claim 2, wherein the third inflatable chamber is oriented at a second angle from the inboard side of the first inflatable chamber, wherein the second angle is defined in a horizontal plane, and wherein the first angle is different from the second angle.

4. The airbag assembly of claim 1, wherein the second inflatable chamber and the third inflatable chamber form a forked configuration.

5. The airbag assembly of claim 1, further comprising a tether, wherein a first end of the tether is coupled to the second inflatable chamber and a second end of the tether is coupled to the third inflatable chamber.

6. The airbag assembly of claim 5, wherein the tether engages the second seatback, and wherein the engagement of the tether with the second seatback pulls the second inflatable chamber and the third inflatable chamber towards each other.

7. The airbag assembly of claim 6, wherein the engagement of the tether with the second seatback engages the second inflatable chamber with a front surface of the second seatback and engages the third inflatable chamber with a back surface of the second seatback.

8. The airbag assembly of claim 5, wherein the tether engages the second seatback, and wherein engagement of the tether with the second seatback causes the second inflatable chamber and the third inflatable chamber to pinch the second seatback.

9. The airbag assembly of claim 8, wherein the second inflatable chamber and the third inflatable chamber pinch the second seatback when the second seat assembly is not laterally aligned with the first seat assembly.

10. The airbag assembly of claim 8, wherein the second inflatable chamber and the third inflatable chamber pinch the second seatback when the second seat assembly is disposed longitudinally in front of the first seat assembly.

11. The airbag assembly of claim 8, wherein the second inflatable chamber and the third inflatable chamber pinch the second seatback when the second seat assembly is disposed longitudinally in back of the first seat assembly.

12. The airbag assembly of claim 1, further comprising a plurality of tethers that couple the second inflatable chamber to the third inflatable chamber.

13. The airbag assembly of claim 1, wherein a seat of the first seat assembly is a passenger's seat.

14. The airbag assembly of claim 1, wherein the first inflatable chamber extends vertically from a seat of the first seat asssembly to a top of a first seatback of the first seat assembly.

15. An airbag assembly comprising:
   a first inflatable chamber deployable on an inboard side of a first seat assembly of a vehicle to be oriented in a longitudinal direction of a vehicle to create a barrier between adjacent passengers in a front row in the vehicle;
   a second inflatable chamber deployable from an inboard side of the first inflatable chamber in a direction that is transverse to a longitudinal axis of the first inflatable chamber; and
   a third inflatable chamber deployable from the inboard side of the first inflatable chamber in a direction that is transverse to the longitudinal axis of the first inflatable chamber and transverse to the second inflatable chamber.

16. The airbag assembly of claim 15, further comprising a tether, wherein a first end of the tether is coupled to the second inflatable chamber and a second end of the tether is coupled to the third inflatable chamber.

17. The airbag assembly of claim 15, further comprising a plurality of tethers that couple the second inflatable chamber to the third inflatable chamber.

18. The airbag assembly of claim 15, wherein, in a deployed state, the second inflatable chamber is in front of a seatback of a second seat assembly adjacent to the first seat assembly and the third inflatable chamber is in back of the seatback of the second seat assembly.

19. The airbag assembly of claim 18, wherein the second inflatable chamber and the third inflatable chamber pinch the seatback of the second seat assembly when the seatback of the second seat asssembly is not laterally aligned with a seatback of the first seat assembly.

20. An airbag assembly comprising:
   a housing to be mounted in an inboard portion of a seat assembly;
   an inflator assembly at least partially disposed within the housing; and
   an airbag in a packaged state within the housing, the airbag to receive inflation gas to expand and deploy from the housing to a deployed state, the airbag in the deployed state comprising:
      a first inflatable chamber extending in a longitudinal direction of a vehicle;
      a second inflatable chamber oriented at a first angle from an inboard side of the first inflatable chamber; and
      a third inflatable chamber oriented at a second angle from the inboard side of the first inflatable chamber,
      wherein the first angle and the second angle are defined in a horizontal plane, and
      wherein the first angle is different from the second angle.

* * * * *